UNITED STATES PATENT OFFICE.

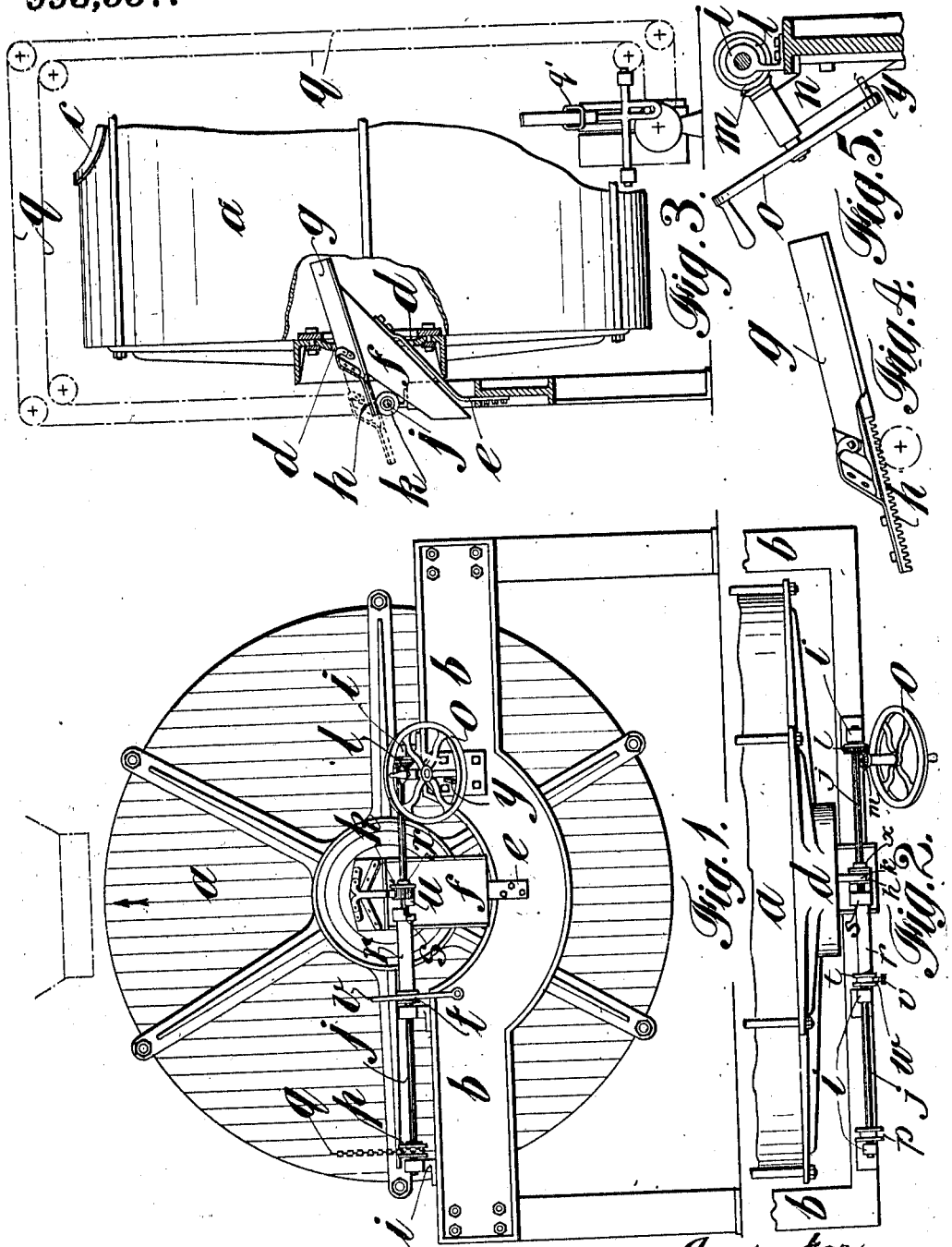

CHARLES A. SCOTT, OF DIDSBURY, ENGLAND.

TEA-BLENDING MACHINERY.

993,557.  Specification of Letters Patent.  Patented May 30, 1911.

Application filed July 2, 1906. Serial No. 324,395.

*To all whom it may concern:*

Be it known that I, CHARLES ARCHIBALD SCOTT, a subject of the King of Great Britain and Ireland, and resident of Didsbury, Manchester, England, have invented certain new and useful Improvements in Tea-Blending Machinery, of which the following is a specification.

Tea blending machinery to which these improvements refer consists of a large rotary drum fitted with internal scoop-like vanes, which, as the drum is rotated, agitate the teas and toss them about "wave" or "shower" fashion until thoroughly blended. The teas, when blended, are withdrawn through an opening in the side of the drum, and the drum requires to be in motion for the teas to flow out. The drum has its full charge when about half full, and a complete blend is usually obtained when the drum has made about eight to ten rotations. After the teas are blended it is desirable that the drum should be rotated as little as possible, since, on the one hand, the teas cannot be further blended, and, on the other hand, further agitation (especially as the drum empties) is harmful to the teas in that it tends to break and damage them and thus reduce their value.

The teas are usually withdrawn in quantities of about 60 to 100 lbs. at a time, and the operator weighs and disposes of each quantity before withdrawing the next. Instead, however, of stopping the drum after each withdrawal and while he is weighing out each quantity, the operator allows it to continue to rotate until it is empty, thus the drum makes a much greater number of rotations than is necessary, and the teas last remaining in the drum are greatly deteriorated in value. To reduce the number of rotations of the drum to the least possible number it is obvious that the motion of the drum should be stopped after each withdrawal of the teas, but inasmuch as the operator cannot be relied on to stop and start the drum after and before each delivery by the ordinary stopping and starting devices, means are required whereby the stopping of the drum, after each withdrawal, shall be effected independently of the will of the operator.

To this end the invention consists essentially of an arrangement of mechanism which serves to open the drum outlet and simultaneously start the drum, and which also serves to close the outlet and simultaneously stop the drum, thereby making the starting and stopping of the drum subservient to the opening and closing of the outlet, which being absolutely necessary operations, insure that the drum shall be stopped after each withdrawal of the teas. In such way the rotations of the drum will be reduced to the least possible number and the teas will be prevented from being injured.

Upon the accompanying drawing, Figure 1 illustrates a front elevation of a tea-blending drum with my invention applied thereto. Fig. 2 illustrates a part plan, and Fig. 3 a vertical cross-section of the front part (or outlet side) of the drum, and an end view of the mechanism forming my invention. Fig. 4 illustrates an enlarged side and detached view of the cover or slide used for opening and closing the drum outlet. Fig. 5 illustrates an enlarged side view of a detail hereinafter referred to.

($a$) is the drum, and ($b$) the usual frame upon which the drum is axially mounted. The inlet ($c$) of the drum is in the periphery of the drum and the outlet ($d$) is in the front side of the drum as shown, and is concentric to the axial center line of the drum. In the said outlet and held stationary by a bar ($e$) is a chute ($f$), the upper end of which is within the drum, while its lower end is outside the drum. Upon the top edges of the sides of the chute slidably fits the cover or lid ($g$), see Fig. 4, which, when pushed inward, fills the opening in the drum above the chute and thus closes the outlet for the teas, while on being drawn outward it uncovers the chute and opens the outlet.

Applied to or formed in the handle part of the cover is a rack ($h$), and supported in bearings ($i$) on the machine frame is a rotary shaft ($j$) whereon is loosely mounted a pinion ($k$), the teeth of which mesh with those of the rack ($h$), see Fig. 4. At one end the shaft ($j$) is fitted with a bevel wheel ($l$), with which meshes a like wheel ($m$), the axis of this latter being carried by a bracket ($n$). Upon such axis is also a handwheel ($o$). At its other end the shaft ($j$) is provided with a chain wheel ($p$) under which passes a chain ($q$) leading to or from the usual strap-fork operating devices ($q'$), see Fig. 3. Also upon the shaft ($j$) is a sleeve ($r$) capable of sliding longitudinally thereon and of rotating therewith through the medium of a key on which it slides. Upon one end of such sleeve is a half-clutch $(s)$, and upon the other end a grooved boss $(t)$. Upon the pinion $(k)$ is a further half-clutch $(u)$, and when the two half-clutches engage and the shaft is rotated, the pinion is rotated, and the cover $(g)$ moved in or out according to the direction of rotation.

When the drum is first charged with the teas to be blended and is ready to be rotated, the sleeve $(r)$ if previously clutched is unclutched from the pinion, so that on rotating the wheel $(o)$ and shaft $(j)$, the motion has no effect on the cover $(g)$, and only the fork of the driving belt is moved, which moving the belt on to the fast pulley starts the drum. The drum, with the outlet closed, then rotates the required number of revolutions for effecting the blending of the teas. When the teas are blended the drum is stopped by rotating the wheel $(o)$ back to its original position. The sleeve $(r)$ is then clutched to the pinion $(k)$ and at the same time or previously a receptacle for the tea is placed beneath the chute $(f)$. The wheel $(o)$ is then again rotated, and this time owing to the pinion $(k)$ rotating with the shaft $(j)$, the cover $(g)$ is drawn out while the drum is restarted. When a sufficient quantity of the tea has passed into the receptacle the wheel $(o)$ is again rotated back to its starting point, by which movement the cover $(g)$ is pushed in again and the motion of the drum immediately stopped. The operator then removes the receptacle and weighs the teas, the drum, all the time the operator is weighing and disposing of the teas, remaining stationary. With each subsequent withdrawal of the teas the same action takes place, the drum being set in motion each time the drum outlet is uncovered, and the motion of the drum being stopped each time the outlet is closed, thus insuring that the drum shall rotate only as much as is necessary for the purpose of delivering the teas, and when the teas are not being delivered shall remain stationary. In such way the teas are prevented being damaged, and the value of the last quantity withdrawn is caused to be almost as good, if not quite as good, in value as the first quantity, or at least of greater value than heretofore. Upon refilling the drum and making ready to blend another lot of teas, the sleeve $(r)$ is unclutched from the pinion $(k)$ until the blending is completed and the drum is stopped, when it is again clutched to the pinion and the drum is again started and stopped and the cover operated as before.

The sleeve $(r)$ is moved to and fro by a lever $(v)$ pivoted to the machine frame and by a pin $(w)$ on such lever engaging the groove of the boss $(t)$. A fixed collar $(x)$ serves to prevent the pinion moving along the shaft when engaged by the sleeve. The traverse of the cover $(g)$ and that of the belt fork of the drum driving belt is correctly determined by a pin $(y)$ on wheel $(o)$, which when the cover is fully home lies against one face of the web of the bracket $(n)$, and which when the wheel has been rotated and the cover is fully drawn out, lies against the other face of the said web of the bracket.

What I claim is:—

In tea blending machinery, a large rotary drum in which the teas are blended, in combination with an outlet cover, a rack connected with such cover, a rotary shaft, and means for rotating the same, a pinion loose upon the shaft and in gear with the said rack, and said pinion having a half-clutch at one end, a fixed collar on the shaft and at one side of the pinion and a sliding sleeve on the shaft at the other side of the pinion, the end of the sleeve nearest the pinion having a half-clutch similar to that on the pinion, and means by which the rotations of the shaft are communicated to the motion-starting and stopping devices on the drum, substantially as set forth.

In witness whereof I have hereunto set my hand in the presence of two witnesses.

C. A. SCOTT.

Witnesses:
JOHN CAMP,
P. D. BAILEY.